(12) United States Patent
Patel et al.

(10) Patent No.: US 12,128,735 B2
(45) Date of Patent: Oct. 29, 2024

(54) DETECTION OF EXTERNAL LEAKS UTILIZING CABIN HUMIDITY MODEL

(71) Applicant: GM Global Technology Operations LLC, Detroit, MI (US)

(72) Inventors: Dhruv Patel, Oshawa (CA); Joseph F. Szczerba, Grand Blanc, MI (US); David Alexander Hinz, Detroit, MI (US); Rupesh Sonu Kakade, West Bloomfield, MI (US); Cynthia A. Nicholson, Oxford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 254 days.

(21) Appl. No.: 17/933,588

(22) Filed: Sep. 20, 2022

(65) Prior Publication Data

US 2024/0092143 A1 Mar. 21, 2024

(51) Int. Cl.
*B60H 1/00* (2006.01)
(52) U.S. Cl.
CPC ................... *B60H 1/00785* (2013.01)
(58) Field of Classification Search
CPC .................................. B60H 1/00785

USPC ........................................................ 165/202
See application file for complete search history.

(56) References Cited

FOREIGN PATENT DOCUMENTS

| CN | 108760177 A | * | 11/2018 |
| CN | 109237118 A | * | 1/2019 |
| CN | 113837213 A | * | 12/2021 |

\* cited by examiner

*Primary Examiner* — Davis D Hwu
(74) *Attorney, Agent, or Firm* — Vivacqua Crane, PLLC

(57) ABSTRACT

A system for detecting external leaks in a cabin of a vehicle includes sensors and onboard vehicle controls disposed on the vehicle. Control modules of the system have processors, memory, and input/output (I/O) ports. The I/O ports communicate with the sensors and onboard vehicle controls. The control modules execute program code portions stored memory. The program code portions include first and second algorithm portions. The first algorithm portion receives data from the sensors and controls and determines that the data from the sensors and controls meets initialization threshold values. When the data from the sensors and controls meets the threshold values, the second algorithm portion generates a cabin leak detection output including: a first output, a second output, or a third output. The first output indicates a large leak, the second output indicates no leak, and the third output indicates that a small leak has been detected.

20 Claims, 5 Drawing Sheets

DETECTION OF EXTERNAL LEAKS UTILIZING CABIN HUMIDITY MODEL

INTRODUCTION

The present disclosure relates to vehicles, and more specifically to vehicle cabin humidity conditions. Vehicle cabins have the potential for water intrusion damage to the vehicle cabin interior. Such damage leads to customer dissatisfaction and warranty costs. Vehicles are increasingly being equipped with networked systems that communicate both internally, i.e. onboard, and externally, i.e. with other vehicles or remotely located infrastructure via a variety of wireless and/or wired communication systems. Vehicle data collection systems generate or capture data relating to a wide range of vehicle attributes, from entertainment and climate-control functions to vehicle dynamics and safety systems. Vehicles and/or infrastructure may collect information regarding atmospheric conditions surrounding vehicles. However, the data collection by such vehicles and infrastructure is often inhibited by cost constraints, vehicle age and condition, and the like.

Accordingly, while current vehicle sensors and communications systems for monitoring vehicle cabin conditions achieve their intended purpose, there is a need for a new and improved system and method for detecting leaks into vehicle cabins that allows for platform and vehicle flexibility, upgradability on both the vehicular end and the remote end of the system, and which operate on preexisting hardware as well as new hardware while maintaining or decreasing manufacturing, assembly, and operational complexity.

SUMMARY

According to an aspect of the present disclosure, a system for detecting external leaks in a cabin of a vehicle utilizing a cabin humidity model includes one or more sensors disposed on the vehicle, and one or more onboard vehicle controls disposed on the vehicle. The system further includes one or more control modules, each of the one or more control modules having a processor, a memory, and input/output (I/O) ports. The I/O ports of the control modules of the vehicles are in communication with the one or more sensors and the one or more onboard vehicle controls. The control modules execute program code portions stored in the memory. The program code portions include a first algorithm portion and a second algorithm portion. The first algorithm portion receives data from the one or more sensors and data from the one or more onboard vehicle controls and determines that the data from the one or more sensors and from the one or more onboard vehicle controls meets predetermined initialization threshold values. In response to determining that the data from the one or more sensors and from the one or more onboard vehicle controls meets the predetermined initialization threshold values, the second algorithm portion generates a cabin leak detection output. The cabin leak detection output includes: a first output, a second output, or a third output. The first output indicates a large leak has been detected, the second output indicates that no leak has been detected, and the third output indicates that a small leak has been detected. The large leak is larger than the small leak, and the small leak is larger than no leak.

In another aspect of the present disclosure the one or more sensors disposed on the vehicle include: door lock sensors, vehicle speed sensors, solar load sensors, cabin temperature sensors, rain sensors, outside air-temperature sensors, window position sensors, front windshield temperature sensors, seat occupancy sensors, cabin humidity sensors, global positioning system (GPS) sensors, vehicle-to-vehicle, vehicle-to-infrastructure sensors, weather data sensors, and diagnostic data sensors. The one or more onboard vehicle controls include heating ventilation and air-conditioning (HVAC) controls, exterior air humidity models, and thermal energy management system controls.

In yet another aspect of the present disclosure the first algorithm portion further includes a first program code portion that determines whether the initialization threshold values have been met. In response to determining that the initialization threshold values have been achieved, the first program code portion enables the system. In response to determining that the initialization threshold values have not been achieved, the first program code portion causes the system to enter a standby mode where the system continuously monitors to determine whether the initialization threshold values have been achieved.

In still another aspect of the present disclosure in response to enabling the system, the first program code portion further determines whether temperature and speed threshold conditions have been met. In response to determining that the temperature and speed threshold conditions have been met, the second algorithm portion is executed. In response to determining that the temperature and speed threshold conditions have not been met, the first program code portion causes the system to enter the standby mode.

In yet another aspect of the present disclosure the initialization threshold values include: heating, ventilation and air-conditioning (HVAC) status, evaporator de-humidification status, door lock status, and window position status. A combination of HVAC off, evaporator de-humidification on, doors locked, and windows closed indicates a seasonal status of summer, spring or fall. A combination of evaporator de-humidification off, doors locked, and windows closed indicates a seasonal status of winter.

In still another aspect of the present disclosure, the second algorithm portion further includes a second program code portion that measures a humidity of the cabin with the one or more sensors, and generates a target cabin humidity from the cabin humidity model. A third program code portion calculates a difference between the target cabin humidity of the cabin and measured cabin humidity.

In yet another aspect of the present disclosure the second algorithm portion further includes a fourth program code portion that, in response to determining that the difference between the target cabin humidity and the measured cabin humidity is greater than a first threshold humidity, generates the first output.

In still another aspect of the present disclosure, the second algorithm portion further includes a fifth program code portion that, in response to determining that the difference between the target cabin humidity and the measured cabin humidity is less than the first threshold humidity, determines that the difference between target cabin humidity and the measured cabin humidity is less than a second threshold smaller than the first threshold and generates the second output.

In yet another aspect of the present disclosure, the second algorithm portion further includes a sixth program code portion that, in response to determining that the difference between the target cabin humidity and the measured cabin humidity is greater than or equal to the second threshold, generates the third output.

In still another aspect of the present disclosure the sixth program code portion further includes a program code portion that references a key cycle counter stored in memory and increments a key cycle counter by one, and in response to determining that a quantity of key cycles in the key cycle counter is greater than or equal to a threshold key cycle value, generates the third output.

In yet another aspect of the present disclosure the system further includes a program code portion that transmits the first, second, or third outputs via the I/O ports of the control module to a human-machine interface (HMI) and a remotely-located back-office system. The HMI includes at least one of: a display within the vehicle, and a vehicle user's mobile device, personal computer, or tablet computer. The remotely-located back-office includes a service database linked to the vehicle and indicating a health status of the vehicle.

In still another aspect of the present disclosure a method of detecting external leaks in a cabin of a vehicle utilizing a cabin humidity model includes receiving, by one or more control modules, data from one or more sensors disposed on the vehicle and data from one or more onboard vehicle controls disposed on the vehicle. Each of the one or more control modules has a processor, a memory, and input/output (I/O) ports. The I/O ports of the control modules of the vehicles are in communication with the one or more sensors and the one or more onboard vehicle controls. The control modules execute program code portions stored in the memory. The method further executes a first algorithm portion that receives data from the one or more sensors and data from the one or more onboard vehicle controls. The method determines that the data from the one or more sensors and from the one or more onboard vehicle controls meets predetermined initialization threshold values. The predetermined initialization threshold values include a heating, ventilation and air-conditioning (HVAC) status, an evaporator de-humidification status, a door lock status, and a window position status. A combination of HVAC off, evaporator de-humidification on, doors locked, and windows closed indicates a seasonal status of summer, spring or fall. A combination of evaporator de-humidification off, doors locked, and windows closed indicates a seasonal status of winter. The method executes a second algorithm portion that, in response to determining that the data from the one or more sensors and from the one or more onboard vehicle controls meets the predetermined initialization threshold values, generates a cabin leak detection output. The cabin leak detection output includes: a first output, a second output, or a third output. The first output indicates a large leak has been detected, the second output indicates that no leak has been detected, and the third output indicates that a small leak has been detected. The large leak is larger than the small leak, and the small leak is larger than no leak. The method transmits the first, second, or third outputs via the I/O ports of the control module to a human-machine interface (HMI).

In yet another aspect of the present disclosure receiving, by one or more control modules, data from one or more sensors disposed on the vehicle and data from one or more onboard vehicle controls disposed on the vehicle further includes receiving data from one or more sensors including: door lock sensors, vehicle speed sensors, solar load sensors, cabin temperature sensors, rain sensors, outside air-temperature sensors, window position sensors, front windshield temperature sensors, seat occupancy sensors, cabin humidity sensors, global positioning system (GPS) sensors, vehicle-to-vehicle, vehicle-to-infrastructure sensors, weather data sensors, and diagnostic data sensors. Receiving data from onboard vehicle controls including: heating ventilation and air-conditioning (HVAC) controls, exterior air humidity models, and thermal energy management system controls.

In still another aspect of the present disclosure the method further includes determining, with a first program code portion, whether the initialization threshold values have been met. In response to determining that the initialization threshold values have been achieved, the second algorithm portion is enabled, and in response to determining that the initialization threshold values have not been achieved, entering a standby mode and continuously monitoring to determine whether the initialization threshold values have been achieved.

In yet another aspect of the present disclosure in response to enabling the second algorithm portion, the method determines whether temperature and speed threshold conditions have been met. In response to determining that the temperature and speed threshold conditions have been met, the method executes the second algorithm portion; and in response to determining that the temperature and speed threshold conditions have not been met, entering the standby mode.

In still another aspect of the present disclosure in response to enabling the second algorithm portion, the method further includes measuring, with a second program code portion, a humidity of the cabin with the one or more sensors, and generating a target cabin humidity from the cabin humidity model. The method further includes calculating, with a third program code portion, a difference between the target cabin humidity of the cabin and measured cabin humidity.

In yet another aspect of the present disclosure in response to determining that the difference between the target cabin humidity and the measured cabin humidity is greater than a first threshold humidity, the method generates with a fourth program code portion, the first output.

In still another aspect of the present disclosure in response to determining that the difference between the target cabin humidity and the measured cabin humidity is less than the first threshold humidity, the method determines with a fifth program code portion, that the difference between target cabin humidity and the measured cabin humidity is less than a second threshold smaller than the first threshold and generating the second output.

In yet another aspect of the present disclosure in response to determining that the difference between the target cabin humidity and the measured cabin humidity is greater than or equal to the second threshold, the method references a key cycle counter stored in memory and incrementing a key cycle counter by one. In response to determining that a quantity of key cycles in the key cycle counter is greater than or equal to a threshold key cycle value, the method generates the third output. The first, second, or third outputs are transmitted via the I/O ports of the control module to a remotely-located back-office system. The HMI includes at least one of: a display within the vehicle, and a vehicle user's mobile device, personal computer, or tablet computer. The remotely-located back-office includes a service database linked to the vehicle and indicating a health status of the vehicle.

In still another aspect of the present disclosure a method of detecting external leaks in a cabin of a vehicle utilizing a cabin humidity model includes receiving, by one or more control modules, data from one or more sensors disposed on the vehicle including: door lock sensors, vehicle speed sensors, solar load sensors, cabin temperature sensors, rain sensors, outside air-temperature sensors, window position sensors, front windshield temperature sensors, seat occupancy sensors, cabin humidity sensors, global positioning system (GPS) sensors, vehicle-to-vehicle, vehicle-to-infrastructure sensors, weather data sensors, and diagnostic data sensors. The method further includes receiving data from one or more onboard vehicle controls disposed on the vehicle including: heating ventilation and air-conditioning (HVAC) controls, exterior air humidity models, and thermal energy management system controls. Each of the one or more control modules has a processor, a memory, and input/output (I/O) ports, the I/O ports of the control modules of the vehicles in communication with the one or more sensors and the one or more onboard vehicle controls. The control modules execute program code portions stored in the memory. The method executes a first algorithm portion that receives data from the one or more sensors and data from the one or more onboard vehicle controls. The method determines that the data from the one or more sensors and from the one or more onboard vehicle controls meets predetermined initialization threshold values. The predetermined initialization threshold values include a heating, ventilation and air-conditioning (HVAC) status, an evaporator de-humidification status, a door lock status, and a window position status. A combination of HVAC off, evaporator de-humidification on, doors locked, and windows closed indicates a seasonal status of summer, spring or fall. A combination of evaporator de-humidification off, doors locked, and windows closed indicates a seasonal status of winter. In response to determining that the data from the one or more sensors and from the one or more onboard vehicle controls meets the predetermined initialization threshold values, the method executes a second algorithm portion including: determining, with a first program code portion, whether the initialization threshold values have been met. In response to determining that the initialization threshold values have been achieved, the method enables the second algorithm portion. In response to determining that the initialization threshold values have not been achieved, entering a standby mode wherein the method continuously monitors to determine whether the initialization threshold values have been achieved. In response to enabling the second algorithm portion, determining whether temperature and speed threshold conditions have been met. In response to determining that the temperature and speed threshold conditions have been met, executing the second algorithm portion. In response to determining that the temperature and speed threshold conditions have not been met, entering the standby mode. The method further includes measuring, with a second program code portion, a humidity of the cabin with the one or more sensors, and generating a target cabin humidity from the cabin humidity model. The method further includes calculating, with a third program code portion, a difference between the target cabin humidity of the cabin and measured cabin humidity. In response to determining that the difference between the target cabin humidity and the measured cabin humidity is greater than or equal to a first threshold humidity, the method generates with a fourth program code portion, a first output. In response to determining that the difference between the target cabin humidity and the measured cabin humidity is less than the first threshold, the method determines with a fifth program code portion, that the difference between target cabin humidity and the measured cabin humidity is less than a second threshold smaller than the first threshold and generating a second output. In response to determining that the difference between the target cabin humidity and the measured cabin humidity is less than the first threshold and greater than or equal to the second threshold, the method references a key cycle counter stored in memory, and increments a key cycle counter by one. In response to determining that a quantity of key cycles in the key cycle counter is greater than or equal to a threshold key cycle value, the method generates a third output. The first output indicates a large leak has been detected, the second output indicates that no leak has been detected, and the third output indicates that a small leak has been detected. The large leak is larger than the small leak, and the small leak is larger than no leak. The method further includes transmitting the first, second, or third outputs via the I/O ports of the control module to a human-machine interface (HMI) and a remotely-located back-office system. The HMI includes at least one of: a display within the vehicle, and a vehicle user's mobile device, personal computer, or tablet computer. The remotely-located back-office includes a service database linked to the vehicle and indicating a health status of the vehicle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

In the claims and specification, certain elements are designated as "first", "second", "third", "fourth", "fifth", "sixth", and "seventh", etc. These are arbitrary designations intended to be consistent only in the section in which they appear, i.e. the specification or the claims or the summary, and are not necessarily consistent between the specification, the claims, and the summary. In that sense they are not intended to limit the elements in any way and a "second" element labeled as such in the claim may or may not refer to a "second" element labeled as such in the specification. Instead, the elements are distinguishable by their disposition, description, connections, and function.

Figure 1:
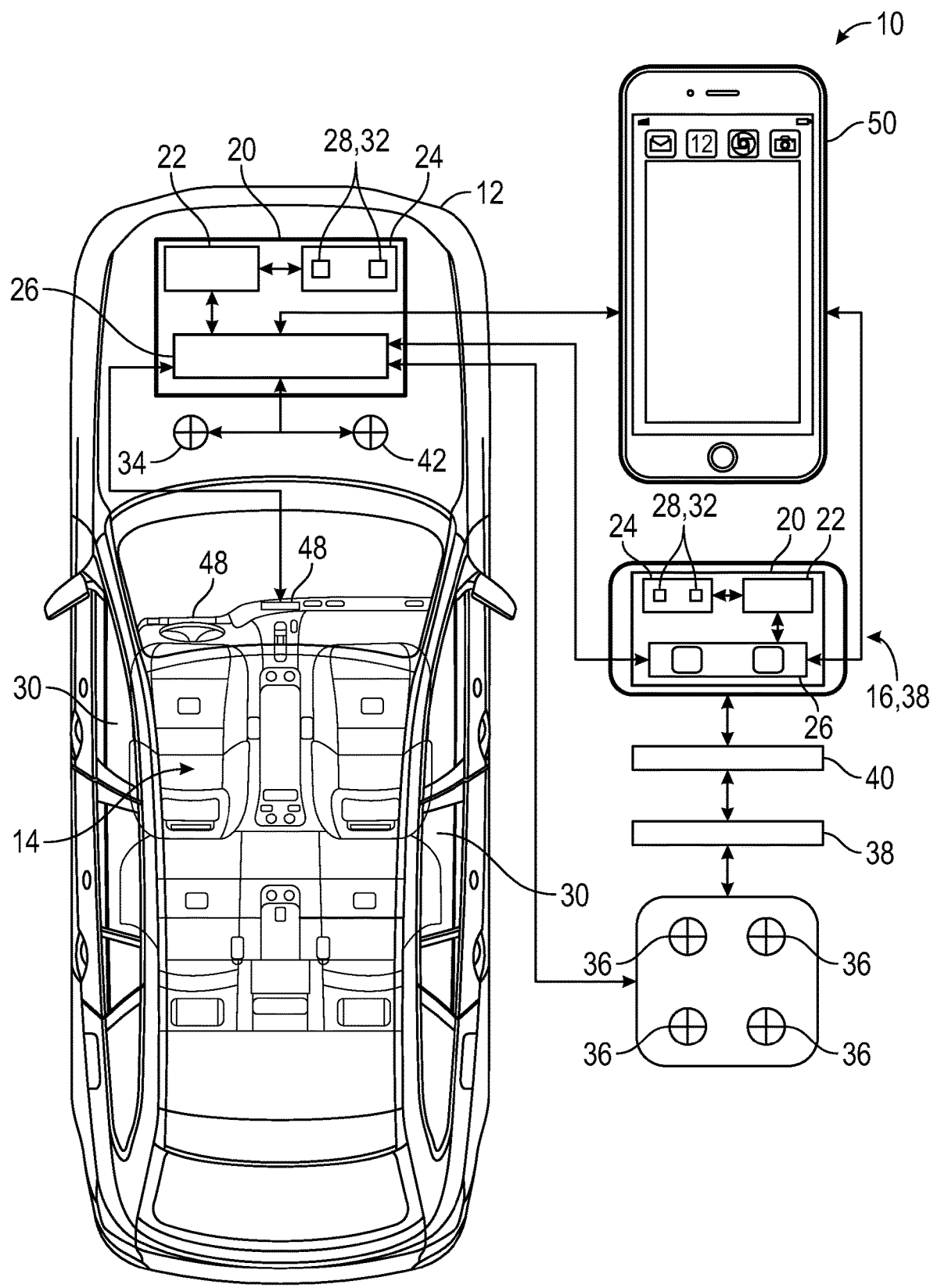
FIG. 1 is a schematic diagram of a system for detecting external leaks in a vehicle using a cabin humidity model according to an aspect of the present disclosure.
Figure 2:
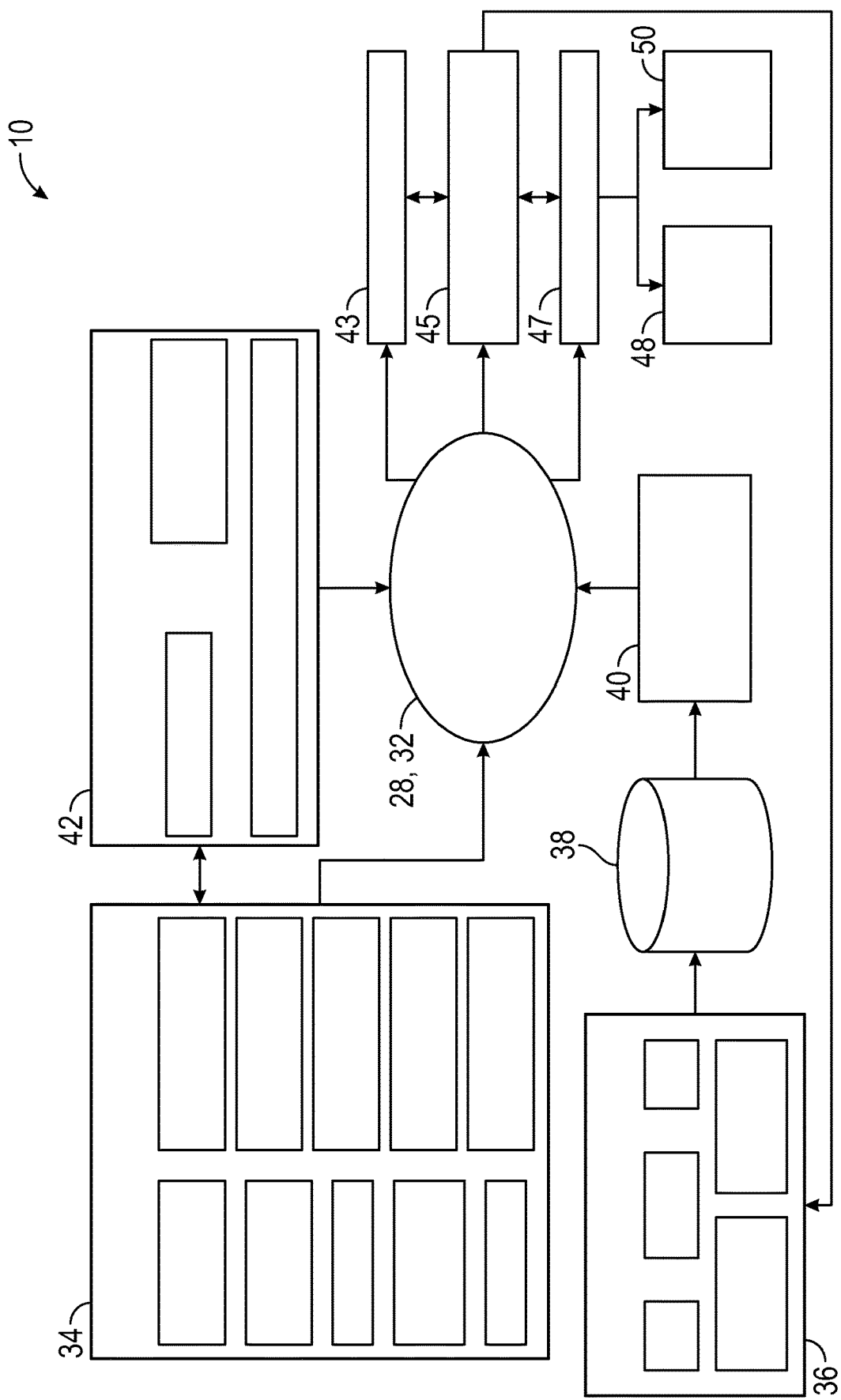
FIG. 2 is a functional block diagram of hardware of the system for detecting external leaks in a vehicle using a cabin humidity model of FIG. 1 according to an aspect of the present disclosure.

Referring now to FIGS. 1 and 2, a system 10 for detecting external leaks to a vehicle 12 utilizing a vehicle cabin humidity model is shown. The system 10 provides a means by which vehicle 12 cabin 14 leaks may be detected. While the vehicle 12 is illustrated as a car, it should be appreciated that the vehicle 12 may be any type of vehicle 12 having a cabin 14, including cars, vans, trucks, motor homes, semis, tractors, aircraft such as planes, helicopters, or the like, or waterborne vehicles such as boats, submarines, yachts, or the like without departing from the scope or intent of the present disclosure. Cabin 14 leaks can potentially allow water intrusion to damage vehicle 12 interior components, leading to customer dissatisfaction and increased warranty costs for vehicle 12 manufacturers. The system provides a means by which vehicle 12 cabin 14 leaks may be detected based on real-time measurements of cabin 14 humidity levels. Cabin 14 humidity decreases when there is a leak that allows air flow between the cabin 14 and the external environment. The cabin 14 leak detection model described herein overcomes this issue by measuring cabin 14 humidity relative gradient/change as a function of various vehicle 12 inputs.

The system 10 operates on the vehicle 12 and a remotely-located back-office system 16, each of which include one or more control modules 20. The control modules 20 are non-generalized, electronic control devices having a preprogrammed digital computer or processor 22, non-transitory computer readable medium or memory 24 used to store data such as control logic, software applications, instructions, computer code, data, lookup tables, etc., and a transceiver or input/output (I/O) ports 26. Memory 24 includes any type of medium capable of being accessed by a computer, such as read only memory (ROM), random access memory (RAM), a hard disk drive, a compact disc (CD), a digital video disc (DVD), or any other type of memory. A "non-transitory" computer readable medium or memory 24 excludes wired, wireless, optical, or other communication links that transport transitory electrical or other signals. A non-transitory computer memory 24 includes media where data may be permanently stored and media where data can be stored and later overwritten, such as a rewritable optical disc or an erasable memory device. Computer code includes any type of program code and program code portions, including source code, object code, and executable code. The processor 22 is configured to execute the code or instructions. The control modules 20 may also be dedicated Wi-Fi controllers, engine control modules, transmission control modules, body control modules, infotainment control modules, or the like. The I/O ports 26 are configured to communicate wirelessly or through wired means with known means, including Wi-Fi protocols under IEEE 802.11x.

The control modules 20 may further include one or more applications 28. An application 28 is a software program configured to perform a specific function or set of functions. The application 28 may include one or more computer programs, algorithms, software components, sets of instructions, procedures, functions, objects, classes, instances, related data, or a portion thereof adapted for implementation in a suitable computer readable program code. The applications 28 may be stored within the memory 24 or in additional or separate memory 24.

Turning now to FIG. 2, and with continuing reference to FIG. 1, in several aspects, one or more of the applications 28 defines a cabin 14 to external leak detection algorithm 32 that utilizes a cabin humidity model. The applications 28, including the external leak detection algorithm 32, utilize a variety of onboard sensors 34 disposed in or on the vehicle 12, and off-board sensors 36. The onboard sensors 34 may include, but are not limited to: door lock sensors, vehicle speed sensors, solar load sensors, cabin temperature sensors, rain sensors, outside air-temperature sensors, window 30 position sensors, front windshield temperature sensors, seat occupancy sensors, cabin humidity sensors, and the like.

Additional off-board sensors 36 generate data that is used to help determine atmospheric conditions surrounding the vehicle 12 and may include but are not limited to: global positioning system (GPS) sensors, OnStar™ sensors, vehicle-to-vehicle and/or vehicle-to-infrastructure sensors, weather data sensors, and diagnostic data sensors, and the like. Data from the off-board sensors 36 is sent to data storage devices such as remotely-located cloud-based data servers 38 or the like. Data from the off-board sensors 36 is passed through the cloud-based data servers 38 to a data and communications network 40 that transmits the off-board sensor 36 data to the external leak detection algorithm 32.

Additional inputs to the system 10 may include a variety of onboard vehicle 12 control inputs 42 as well. The onboard vehicle control inputs 42 may be from various onboard vehicle controls 42 including but not limited to: heating ventilation and air-conditioning (HVAC) controls, exterior air humidity models, and thermal energy management systems, or the like. In several aspects, the onboard sensors 34 communicate and exchange data with the onboard vehicle controls 42 directly. Data from the onboard sensors 34 and onboard vehicle controls 42 is sent directly to the external leak detection algorithm 32 as well. After the external leak detection algorithm 32 has determined whether a leak is present, the system 10 transmits the results of the leak detection algorithm 32 to a diagnostic set 43, as well reporting the results to a service database 45 and to vehicle 12 users and/or service technicians via a graphical processor 47 and a display.

Figure 3A:
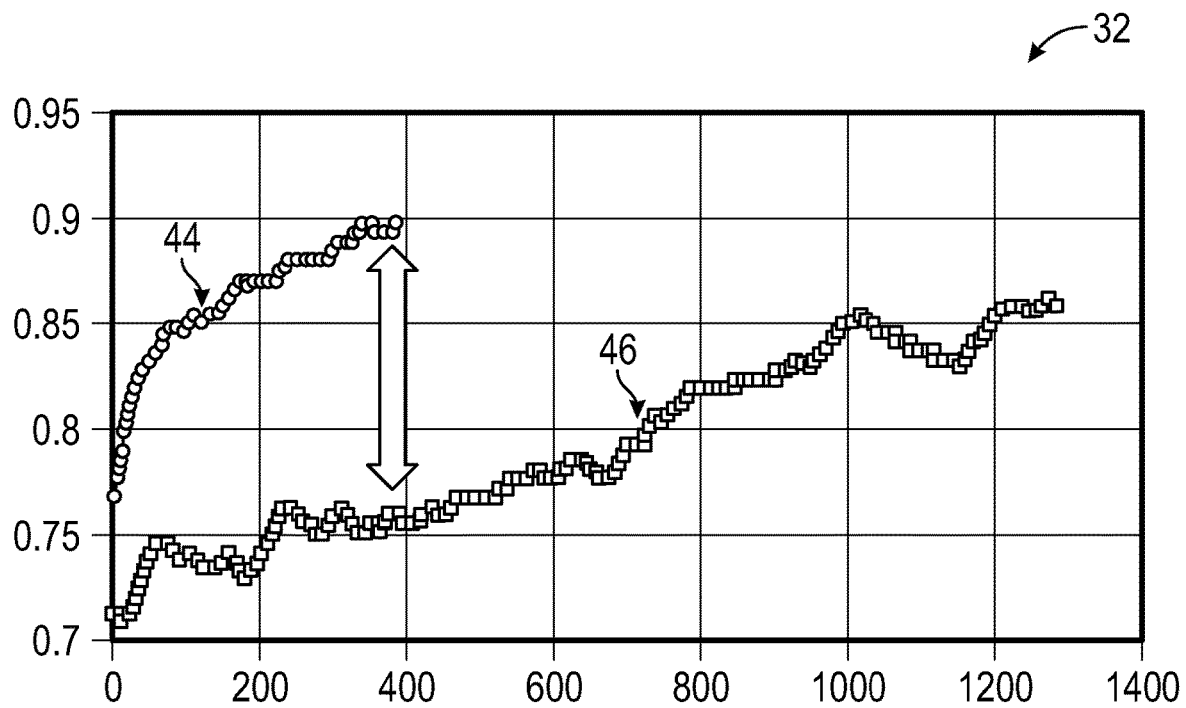
FIG. 3A is a graphical representation of the function of a system for detecting external leaks in a vehicle using a cabin humidity model where under a first set of test parameters.
Figure 3B:
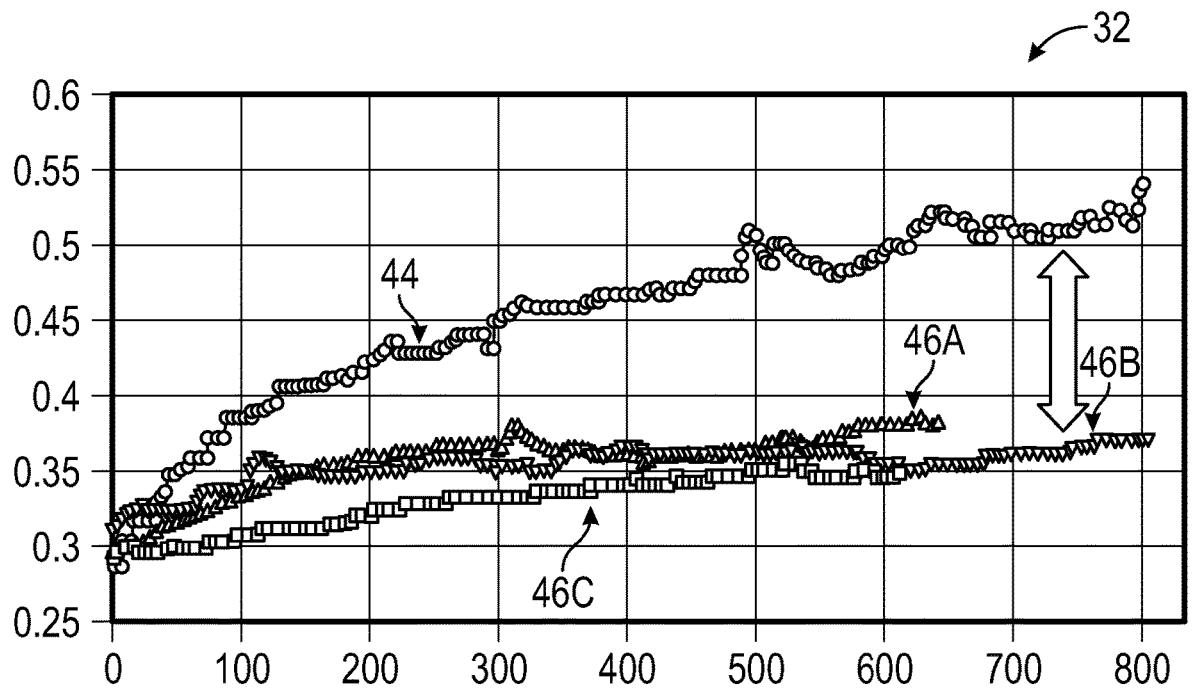
FIG. 3B is a graphical representation of the function of a system for detecting external leaks in a vehicle using a cabin humidity model where under a second set of test parameters.

Turning now to FIGS. 3A and 3B, and with continuing reference to FIGS. 1 and 2, the external leak detection algorithm 32 is shown in further detail. More specifically, FIGS. 3A and 3B are graphical representations of cabin 14 humidity levels including a no-leak trace 44 and one or more leak traces 46. During certain atmospheric conditions, especially those which regularly occur in the summer, spring, and fall, cabin 14 humidity content is expected to increase in the presence of vehicle 12 occupants. This is especially true when the vehicle 12 evaporator de-humidification is operating and the HVAC is off, thereby ensuring the cabin is essentially a closed system representative with doors locked and window 30 positions fully closed. Similarly, in wintry conditions when the cabin 14 temperature is relatively cold (i.e. below about 50° F.), cabin 14 humidity also increases in the presence of occupants. By contrast, in winter conditions, the evaporator de-humidifier is not required to be in an on state, and all other conditions remain identical to those in summer, spring, and fall. Accordingly, in both of the above-referenced scenarios humidity levels in the cabin 14 will decrease if there is a leak between the cabin 14 and the external environment surrounding the vehicle 12. The cabin 14 leak detection strategy carried out in the external leak detection algorithm 32 is further categorized into two domains: Large Leak Detection (LLD) and Small Leak Detection (SLD). The LLD detects deviations between expected cabin 14 humidity levels and actual cabin 14 humidity levels over a relatively short period of time, such as approximately 3-10 minutes. By contrast, the SLD detects deviations between expected cabin 14 humidity levels and actual cabin 14 humidity levels over an extended period of time, such as several hours, days, weeks, and/or over a plurality of key cycles, or the like. In several aspects, expected cabin 14 humidity levels follow the form of a logarithmic curve in the provided graphs shown in FIGS. 3A and 3B. By contrast, cabin 14 humidity levels tend to follow substantially linear leak traces 46 when either a large leak or a small leak has been introduced into the system 10.

The leak trace 46 of FIG. 3A depicts cabin humidity over time with both vehicle 12 front windows 30 of the vehicle 12 open by approximately one inch. More specifically, the leak trace 46 of FIG. 3A depicts the results of a testing environment in which the opened windows 30 were used to simulate an external environmental leak into the cabin 14 of the vehicle 12. As is shown in FIG. 3A, there is a substantial reduction in relative cabin 14 humidity due to potential leaks in the cabin 14 under operating conditions where the vehicle 12 is being driven at approximately twenty-five miles-per-hour, and the outside atmospheric temperature is approximately −5° Celsius, the HVAC system is off, and there is a single occupant in the vehicle 12. In an example, the reduction in relative cabin 14 humidity under such conditions may be up to about 16% due to the potential leak in the cabin 14.

Similarly, the leak traces 46 of FIG. 3B depict cabin humidity over time with a single window 30 open by one inch in a first leak trace 46A, with two windows 30 open by one inch in a second leak trace 46B, and with one window 30 open by six inches in a third leak trace 46C. As with the results depicted in FIG. 3A, there is a substantial reduction in relative cabin 14 humidity due to potential leaks in the cabin 14 under operating conditions where the vehicle 12 is being driven at approximately twenty-five miles-per-hour, and the outside atmospheric temperature is approximately 5° Celsius, the HVAC system is off, and there is a single occupant in the vehicle 12. In an example, the reduction in relative cabin 14 humidity under such conditions may be up to about 30% due to the potential leak in the cabin 14. Especially in the SLD example shown in FIG. 3B, the larger the size of the leak (i.e. the wider a window 30 of the vehicle 12 has been opened), the more linear the leak traces 46A, 46B, 46C become.

Figure 4:
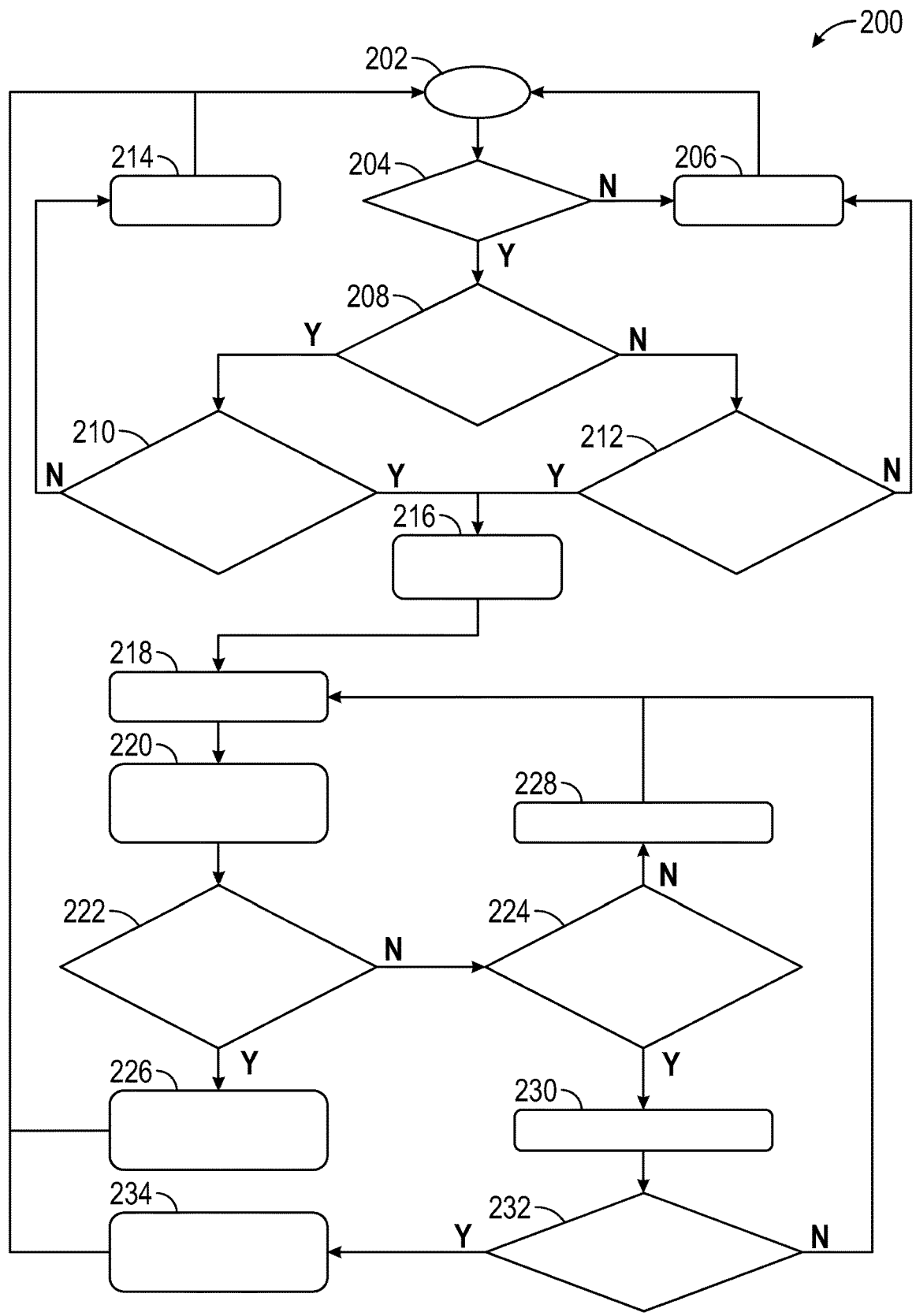
FIG. 4 is a flow chart depicting a method for detecting external leaks in a vehicle using a cabin humidity model according to an aspect of the present disclosure.

Turning now to FIG. 4 and with continuing reference to FIGS. 1-3B, a method 200 of detecting external leaks to a vehicle 12 cabin 14 utilizing a cabin humidity model is depicted in flowchart form. The method 200 begins at block 202 where execution of a first algorithm portion begins. At block 204, the system 10 determines whether it has been enabled by determining if an occupant or a driver of the vehicle 12 has enabled the system 10, and whether a vehicle 12 inactivity timer is greater than or equal to a threshold quantity of time. When the system 10 has not yet been enabled by the occupant or driver of the vehicle 12 and/or the vehicle 12 inactivity timer indicates that an amount of time less than the threshold quantity of time has elapsed, the method 200 proceeds to block 206 and enters a standby mode. However, when the system 10 has been enabled, the method 200 proceeds to block 208.

At block 208, the system 10 executes a first program code portion that determines whether predetermined initialization threshold values have been met. In several aspects, the initialization thresholds include an outside air temperature threshold, a cabin temperature threshold, and a vehicle speed threshold. When the outside air temperature and cabin 14 temperature are equal to or greater than predetermined threshold temperatures and the vehicle 12 speed is less than a threshold speed, the method 200 proceeds to block 210. By contrast, when the outside air temperature and cabin 14 temperature are less than predetermined threshold temperatures and the vehicle 12 speed is greater than or equal to a threshold speed, the method 200 proceeds to block 212.

At block 210, the system 10 determines that the vehicle 12 is operating in spring, summer, or fall seasonal conditions. Additionally, at block 210, the system 10 determines whether the HVAC is in an inactive or "off" state or a low fan speed setting, if the evaporator de-humidification is active or in an "on" state, and if the door lock sensors indicate that the door locks are in a "locked" state, and whether the window 30 position sensors indicate that the vehicle 12 windows 30 are in a "closed" state. If the HVAC is not in an "off" state or the fan speed is not "low", or if the evaporator dehumidification is inactive or in an "off" state, or if the door lock sensors indicate that the door locks are "unlocked" or if the window 30 position sensors indicate that the vehicle 12 windows 30 are open, the method 200 proceeds to block 214 and the system 10 enters a standby mode. By contrast, when the HVAC is in an inactive or "off" state or a low fan speed setting, if the evaporator de-humidification is active or in an "on" state, and when the door lock sensors indicate that the door locks are in a "locked" state, and when the window 30 position sensors indicate that the vehicle 12 windows 30 are in a "closed" state, the method 200 proceeds to block 216 and a second algorithm portion of the external leak detection algorithm 32 is enabled.

At block 212 the system 10 determines that the vehicle 12 is operating in winter seasonal conditions. Additionally, at block 212, the system 10 determines whether the evaporator de-humidification is inactive or in an "off" state, and if the door lock sensors indicate that the door locks are in a "locked" state, and whether the window 30 position sensors indicate that the vehicle 12 windows 30 are in a "closed" state. If the evaporator de-humidification is active or in an "on" state, or if the door lock sensors indicate that the door locks are "unlocked" or if the window 30 position sensors indicate that the vehicle 12 windows 30 are open, the method 200 proceeds to block 206 and the system 10 enters a standby mode. By contrast, when the evaporator de-humidification is inactive or in an "off" state, and when the door lock sensors indicate that the door locks are in a "locked" state, and when the window 30 position sensors indicate that the vehicle 12 windows 30 are in a "closed" state, the method 200 proceeds to block 216 and the external leak detection algorithm 32 is enabled.

The method 200 proceeds from block 216 to block 218 where the system 10 executes a second program code portion that receives input data from various onboard vehicle 12 systems. In several aspects, the input data may include vehicle 12 power modes, outside air temperature, vehicle 12 speed, vehicle 12 driving direction, solar load, cabin 14 current humidity and temperature, HVAC settings, seat occupancy data, rain sensor data, outside air humidity, door lock and window 30 position sensor data, and front windshield temperature, or the like. From block 218, the method 200 proceeds to block 220 where the cabin humidity model provides a target cabin 14 humidity based on reference values obtained via known means such as experimentation and measurement, predetermined idealized humidity values, or the like, or from utilizing the input data from the variety of onboard sensors 34, off-board sensors 36, and from the control inputs 42 as well.

At block 222, the system 10 executes a third program code portion that determines whether a difference between the target cabin 14 humidity values and measured cabin 14 humidity values is equal to or greater than a first threshold value. When the difference between the target cabin 14 humidity values and the measured cabin 14 humidity values is equal to or greater than the first threshold value, the method 200 proceeds to block 226 and executes a fourth program code portion that reports that a large leak has been detected between the cabin 14 and the external environment. The large leak may be reported to a vehicle 12 occupant, technician, or similar via a wide variety of known means such as via the diagnostic set 43, as well reporting the results to the service database 45 and to vehicle 12 users and/or service technicians via a graphical processor 47 and a display such as a human-machine interface (HMI) device 48 or via a third party mobile device such as a mobile device 50, personal computer, tablet computer, or any of a wide variety of similar devices or systems. From block 226, the method proceeds back to block 202 and runs again. When the difference between the target cabin 14 humidity values and the measured cabin 14 humidity values is less than the first threshold value, the method 200 proceeds to block 224.

At block 224, the system 10 executes a fifth program code portion that determines whether a difference between the target cabin 14 humidity values and the measured cabin 14 humidity values is less than the first threshold, and determines whether the difference between target cabin 14 humidity and the measured cabin humidity 14 is less than a second threshold the method proceeds to block 228 where the system 10 generates a second output indicating that no leak has been detected. From block 228, the method 200 proceeds back to block 218 where the system 10 receives input data from various onboard vehicle 12 systems again. However, when the difference between the target and measured cabin 14 humidity values is less than the first threshold and greater than or equal to the second threshold, the method 200 proceeds to block 230, where the system 10 executes a sixth program code portion that increments a key cycle in memory 24. The term "key cycle" may vary in meaning from vehicle-to-vehicle or application-to-application. However, it should be appreciated that in general terms a key cycle is a driving cycle of a vehicle 12 that begins with an engine or powertrain start and ends with a shut-down of the engine or powertrain. In further examples, a key cycle may be defined as a driving cycle of a vehicle that begins upon occupant entry to the vehicle 12 and lasts until occupant departure from the vehicle 12, or the like.

From block 230, the method 200 proceeds to block 232 where the system 10 determines whether the quantity of key cycles is greater than or equal to a threshold key cycle value. When the quantity of key cycles is less than the threshold key cycle value, the method 200 returns back to block 218 where the system 10 receives input data from various onboard vehicle 12 systems again. However, when the quantity of key cycles is greater than or equal to a threshold key cycle value, the method 200 proceeds to block 234. At block 234, the system 10 reports that a small leak is detected. From block 234, the method 200 returns to block 202 where the method 200 runs again. It should be appreciated that the method 200 may run continuously, cyclically, recursively, periodically, at a request from a service technician or remote back-office system, or at a vehicle 12 user's discretion without departing from the scope or intent of the present disclosure. In specific examples, the method 200 may run at vehicle 12 startup, after a predetermined quantity of key cycles, or at other such predefined times, or upon the occurrence of a predefined condition or set of conditions. Additionally, it should be appreciated that the system 10 and method 200 described herein may generate a diagnostic report of the vehicle's 12 cabin 14 leak status periodically and transmit the diagnostic report to a centralized remote database for further analysis, compilation, and aggregation. Accordingly, a health status of the vehicle 12 may be updated and maintained to assist the vehicle's 12 owner and warranty servicer in addressing potential cabin 14 leaks. That is, upon successful LLD or SLD, the system 10 notifies vehicle 12 users and a database in the remotely-located back-office system 16.

Figure 5:
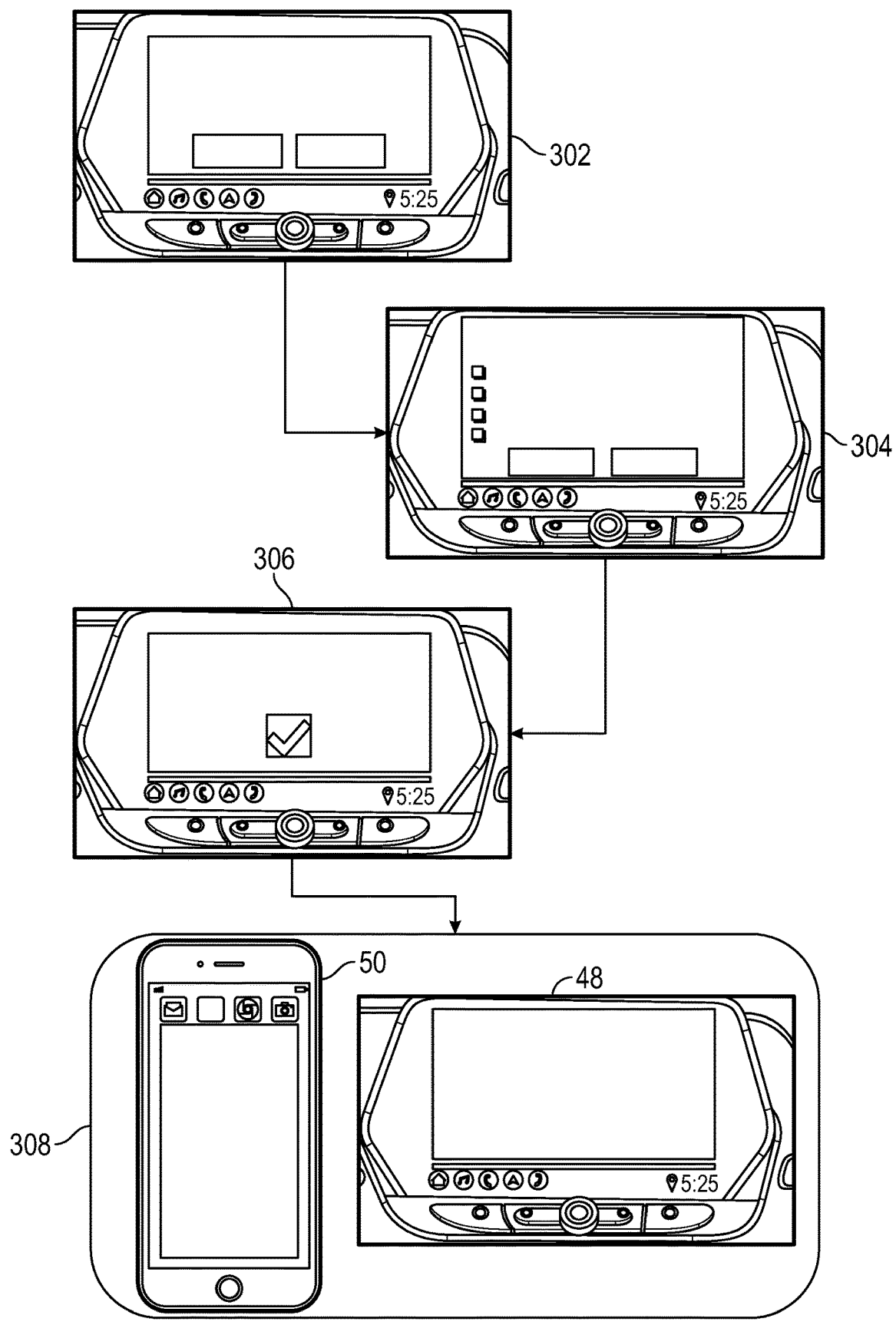
FIG. 5 is a flow chat depicting a process by which a user may initiate the system and method for detecting external leaks in a vehicle using a cabin humidity model according to an aspect of the present disclosure.

Turning now to FIG. 5 and with continuing reference to FIGS. 1-4, a portion of the system 10 is shown in further detail. As noted above, an occupant of the vehicle 12 or a vehicle 12 technician may initiate the method 200 of FIG. 4 to determine whether a cabin 14 leak is present in the vehicle 12. Accordingly to several aspects, the system 10 may be accessed by an occupant or technician via the HMI device 48 of the vehicle 12 at block 302. The HMI device 48 may be a telematics screen, an infotainment system, a selection of buttons, knobs, or other such vehicle controls which may be accessed in a predetermined pattern of engagement, or the like. In several aspects, if an occupant or technician requests a leak test, the vehicle 12 will provide instructions as to how to configure the vehicle 12 systems and components. For example, upon receiving a leak test request, the system 10 may request a first input from the occupant or technician confirming that the leak test has been properly requested as shown at 304. The system 10 subsequently instructs the occupant or technician to set certain vehicle 12 systems to a test-ready state. For example, the system 10 may instruct the occupant or technician to set the HVAC to an "OFF" state, the evaporator to an "ON" state, the doors to a "LOCKED" state, and the windows 30 to a "CLOSED" state as shown at 306. Upon confirming that the vehicle 12 systems are in a test-ready state, the system 10 performs the method of FIG. 4 and generates an output display of the result on the HMI device 48 as shown at 308. The system 10 may further inform an occupant or technician of the leak test results of the vehicle 12 via a third party mobile device such as a mobile device 50, personal computer, tablet computer, or any of a wide variety of similar means.

A system and method for detecting external leaks utilizing a cabin humidity model of the present disclosure offers several advantages. These include increasing customer satisfaction and decreasing warranty costs, while allowing for platform and vehicle flexibility, upgradability on both the vehicular end and the remote end of the system, and which operate on preexisting hardware as well as new hardware while maintaining or decreasing the cost of manufacture, assembly, and operation, and increasing vehicle reliability.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for detecting external leaks in a cabin of a vehicle utilizing a cabin humidity model, the system comprising:
   one or more sensors disposed on the vehicle;
   one or more onboard vehicle controls disposed on the vehicle;
   one or more control modules, each of the one or more control modules having a processor, a memory, and input/output (I/O) ports, the I/O ports of the control modules of the vehicles in communication with the one or more sensors and the one or more onboard vehicle controls; the control modules executing program code portions stored in the memory, the program code portions comprising:

a first algorithm portion that receives data from the one or more sensors and data from the one or more onboard vehicle controls and determines that the data from the one or more sensors and from the one or more onboard vehicle controls meets predetermined initialization threshold values; and a second algorithm portion that, in response to determining that the data from the one or more sensors and from the one or more onboard vehicle controls meets the predetermined initialization threshold values, generates a cabin leak detection output, wherein the cabin leak detection output comprises: a first output, a second output, or a third output, wherein the first output indicates a large leak has been detected, the second output indicates that no leak has been detected, and the third output indicates that a small leak has been detected, wherein the large leak is larger than the small leak, and the small leak is larger than no leak.

2. The system of claim 1 wherein the one or more sensors disposed on the vehicle comprise:

door lock sensors, vehicle speed sensors, solar load sensors, cabin temperature sensors, rain sensors, outside air-temperature sensors, window position sensors, front windshield temperature sensors, seat occupancy sensors, cabin humidity sensors, global positioning system (GPS) sensors, vehicle-to-vehicle, vehicle-to-infrastructure sensors, weather data sensors, and diagnostic data sensors, and wherein the one or more onboard vehicle controls comprise:
heating ventilation and air-conditioning (HVAC) controls, exterior air humidity models, and thermal energy management system controls.

3. The system of claim 1 wherein the first algorithm portion further comprises:

a first program code portion that determines whether the initialization threshold values have been met, and in response to determining that the initialization threshold values have been achieved, enables the system, and in response to determining that the initialization threshold values have not been achieved, causes the system to enter a standby mode where the system continuously monitors to determine whether the initialization threshold values have been achieved.

4. The system of claim 3 wherein in response to enabling the system, the first program code portion further determines whether temperature and speed threshold conditions have been met, and in response to determining that the temperature and speed threshold conditions have been met, executes the second algorithm portion, and in response to determining that the temperature and speed threshold conditions have not been met, causes the system to enter the standby mode.

5. The system of claim 3 wherein the initialization threshold values comprise:

heating, ventilation and air-conditioning (HVAC) status, evaporator de-humidification status, door lock status, and window position status; wherein a combination of HVAC off, evaporator de-humidification on, doors locked, and windows closed indicates a seasonal status of summer, spring or fall; and wherein a combination of evaporator de-humidification off, doors locked, and windows closed indicates a seasonal status of winter.

6. The system of claim 1 wherein the second algorithm portion further comprises:

a second program code portion that measures a humidity of the cabin with the one or more sensors, and generates a target cabin humidity from the cabin humidity model; and a third program code portion that calculates a difference between the target cabin humidity of the cabin and measured cabin humidity.

7. The system of claim 6 wherein the second algorithm portion further comprises:

a fourth program code portion that, in response to determining that the difference between the target cabin humidity and the measured cabin humidity is greater or equal to a first threshold humidity, generates the first output.

8. The system of claim 7 wherein the second algorithm portion further comprises:

a fifth program code portion that, in response to determining that the difference between the target cabin humidity and the measured cabin humidity is less than the first threshold humidity, determines that the difference between target cabin humidity and the measured cabin humidity is less than a second threshold smaller than the first threshold and generates the second output.

9. The system of claim 8 wherein the second algorithm portion further comprises:

a sixth program code portion that, in response to determining that the difference between the target cabin humidity and the measured cabin humidity is greater than or equal to the second threshold, generates the third output.

10. The system of claim 9 wherein the sixth program code portion further comprises:

a program code portion that references a key cycle counter stored in memory and increments a key cycle counter by one, and in response to determining that a quantity of key cycles in the key cycle counter is greater than or equal to a threshold key cycle value, generates the third output.

11. The system of claim 1 further comprising a program code portion that transmits the first, second, or third outputs via the I/O ports of the control module to a human-machine interface (HMI) and a remotely-located back-office system, wherein the HMI comprises at least one of: a display within the vehicle, and a vehicle user's mobile device, personal computer, or tablet computer, and wherein the remotely-located back-office includes a service database linked to the vehicle and indicating a health status of the vehicle.

12. A method of detecting external leaks in a cabin of a vehicle utilizing a cabin humidity model, the method comprising:

receiving, by one or more control modules, data from one or more sensors disposed on the vehicle and data from one or more onboard vehicle controls disposed on the vehicle, each of the one or more control modules having a processor, a memory, and input/output (I/O) ports, the I/O ports of the control modules of the vehicles in communication with the one or more sensors and the one or more onboard vehicle controls; the control modules executing program code portions stored in the memory;

executing a first algorithm portion that receives data from the one or more sensors and data from the one or more onboard vehicle controls;

determining that the data from the one or more sensors and from the one or more onboard vehicle controls meets predetermined initialization threshold values, wherein the predetermined initialization threshold values include a heating, ventilation and air-conditioning (HVAC) status, an evaporator de-humidification status, a door lock status, and a window position status; wherein a combination of HVAC off, evaporator de-humidification on, doors locked, and windows closed indicates a seasonal status of summer, spring or fall; and wherein a combination of evaporator de-humidification off, doors locked, and windows closed indicates a seasonal status of winter;

executing a second algorithm portion that, in response to determining that the data from the one or more sensors and from the one or more onboard vehicle controls meets the predetermined initialization threshold values, generates a cabin leak detection output, wherein the cabin leak detection output comprises: a first output, a second output, or a third output, wherein the first output indicates a large leak has been detected, the second output indicates that no leak has been detected, and the third output indicates that a small leak has been detected, wherein the large leak is larger than the small leak, and the small leak is larger than no leak; and transmitting the first, second, or third outputs via the I/O ports of the control module to a human-machine interface (HMI).

13. The method of claim 12, wherein receiving, by one or more control modules, data from one or more sensors disposed on the vehicle and data from one or more onboard vehicle controls disposed on the vehicle further comprises:

receiving data from one or more sensors including: door lock sensors, vehicle speed sensors, solar load sensors, cabin temperature sensors, rain sensors, outside air-temperature sensors, window position sensors, front windshield temperature sensors, seat occupancy sensors, cabin humidity sensors, global positioning system (GPS) sensors, vehicle-to-vehicle, vehicle-to-infrastructure sensors, weather data sensors, and diagnostic data sensors, and receiving data from onboard vehicle controls including: heating ventilation and air-conditioning (HVAC) controls, exterior air humidity models, and thermal energy management system controls.

14. The method of claim 12 further comprising:

determining, with a first program code portion, whether the initialization threshold values have been met; and in response to determining that the initialization threshold values have been achieved, enabling the second algorithm portion; and in response to determining that the initialization threshold values have not been achieved, entering a standby mode and continuously monitoring to determine whether the initialization threshold values have been achieved.

15. The method of claim 14 wherein in response to enabling the second algorithm portion, determining whether temperature and speed threshold conditions have been met; and in response to determining that the temperature and speed threshold conditions have been met, executing the second algorithm portion; and in response to determining that the temperature and speed threshold conditions have not been met, entering the standby mode.

16. The method of claim 12 wherein the second algorithm portion further comprises:

measuring, with a second program code portion, a humidity of the cabin with the one or more sensors, and generates a target cabin humidity from the cabin humidity model; and calculating, with a third program code portion, a difference between the target cabin humidity of the cabin and measured cabin humidity.

17. The method of claim 16 wherein in response to determining that the difference between the target cabin humidity and the measured cabin humidity is greater or equal to a first threshold humidity, generating with a fourth program code portion, the first output.

18. The method of claim 17 wherein in response to determining that the difference between the target cabin humidity and the measured cabin humidity is less than the first threshold humidity, determining with a fifth program code portion, that the difference between target cabin humidity and the measured cabin humidity is less than a second threshold smaller than the first threshold and generating the second output.

19. The method of claim 18 wherein in response to determining that the difference between the target cabin humidity and the measured cabin humidity is greater than or equal to the second threshold, referencing a key cycle counter stored in memory;

incrementing a key cycle counter by one; and in response to determining that a quantity of key cycles in the key cycle counter is greater than or equal to a threshold key cycle value, generating the third output, wherein the first, second, or third outputs are transmitted via the I/O ports of the control module to a remotely-located back-office system, wherein the HMI comprises at least one of: a display within the vehicle, and a vehicle user's mobile device, personal computer, or tablet computer, and wherein the remotely-located back-office includes a service database linked to the vehicle and indicating a health status of the vehicle.

20. A method of detecting external leaks in a cabin of a vehicle utilizing a cabin humidity model, the method comprising:

receiving, by one or more control modules, data from one or more sensors disposed on the vehicle including: door lock sensors, vehicle speed sensors, solar load sensors, cabin temperature sensors, rain sensors, outside air-temperature sensors, window position sensors, front windshield temperature sensors, seat occupancy sensors, cabin humidity sensors, global positioning system (GPS) sensors, vehicle-to-vehicle, vehicle-to-infrastructure sensors, weather data sensors, and diagnostic data sensors; and receiving data from one or more onboard vehicle controls disposed on the vehicle including: heating ventilation and air-conditioning (HVAC) controls, exterior air humidity models, and thermal energy management system controls, wherein each of the one or more control modules has a processor, a memory, and input/output (I/O) ports, the I/O ports of the control modules of the vehicles in communication with the one or more sensors and the one or more onboard vehicle controls; the control modules executing program code portions stored in the memory;

executing a first algorithm portion that receives data from the one or more sensors and data from the one or more onboard vehicle controls;

determining that the data from the one or more sensors and from the one or more onboard vehicle controls meets predetermined initialization threshold values, wherein the predetermined initialization threshold values include a heating, ventilation and air-conditioning (HVAC) status, an evaporator de-humidification status, a door lock status, and a window position status; wherein a combination of HVAC off, evaporator de-humidification on, doors locked, and windows closed indicates a seasonal status of summer, spring or fall; and wherein a combination of evaporator de-humidification off, doors locked, and windows closed indicates a seasonal status of winter;

in response to determining that the data from the one or more sensors and from the one or more onboard vehicle controls meets the predetermined initialization threshold values, executing a second algorithm portion including:

determining, with a first program code portion, whether the initialization threshold values have been met; and in response to determining that the initialization threshold values have been achieved, enabling the second algorithm portion;

in response to determining that the initialization threshold values have not been achieved, entering a standby mode wherein the method continuously monitors to determine whether the initialization threshold values have been achieved;

in response to enabling the second algorithm portion, determining whether temperature and speed threshold conditions have been met;

in response to determining that the temperature and speed threshold conditions have been met, executing the second algorithm portion;

in response to determining that the temperature and speed threshold conditions have not been met, entering the standby mode;

measuring, with a second program code portion, a humidity of the cabin with the one or more sensors, and generates a target cabin humidity from the cabin humidity model; and calculating, with a third program code portion, a difference between the target cabin humidity of the cabin and measured cabin humidity;

in response to determining that the difference between the target cabin humidity and the measured cabin humidity is greater or equal to a first threshold humidity, generating with a fourth program code portion, a first output;

in response to determining that the difference between the target cabin humidity and the measured cabin humidity is less than the first threshold, determining with a fifth program code portion, that the difference between target cabin humidity and the measured cabin humidity is less than a second threshold smaller than the first threshold and generating a second output;

in response to determining that the difference between the target cabin humidity and the measured cabin humidity is less than the first threshold and greater than or equal to the second threshold, referencing a key cycle counter stored in memory;

incrementing a key cycle counter by one; and in response to determining that a quantity of key cycles in the key cycle counter is greater than or equal to a threshold key cycle value, generating a third output, wherein the first output indicates a large leak has been detected, the second output indicates that no leak has been detected, and the third output indicates that a small leak has been detected, wherein the large leak is larger than the small leak, and the small leak is larger than no leak; and transmitting the first, second, or third outputs via the I/O ports of the control module to a human-machine interface (HMI) and a remotely-located back-office system, wherein the HMI comprises at least one of: a display within the vehicle, and a vehicle user's mobile device, personal computer, or tablet computer, and wherein the remotely-located back-office includes a service database linked to the vehicle and indicating a health status of the vehicle.

\* \* \* \* \*